J. S. REYNOLDS
Flour Cooler.
No. 84,842.
Patented Dec. 8, 1868.
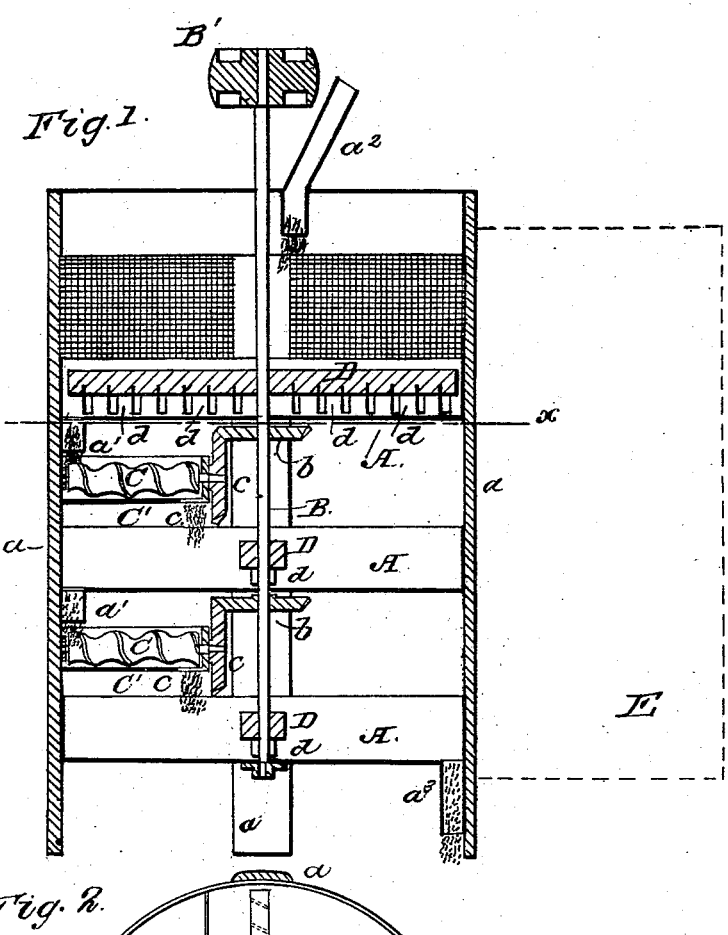
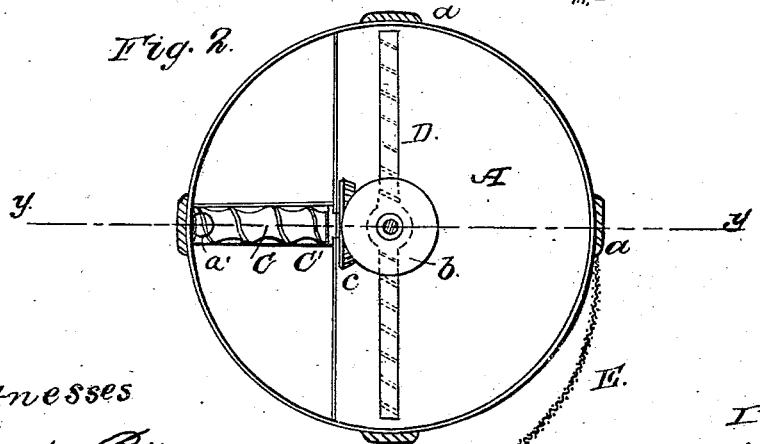
Witnesses
J. Snowden Bell
Charles Herrin
Inventor
J S Reynolds
By D E Somes & Co his atty

JOSEPH S. REYNOLDS, OF WAUCONDA, ILLINOIS.

Letters Patent No. 84,842, dated December 8, 1868.

IMPROVED FLOUR-COOLER.

The Schedule referred to in these Letters Patent and making part of the same.

*To all whom it may concern:*

Be it known that I, JOSEPH S. REYNOLDS, of Wauconda, in the county of Lake, and in the State of Illinois, have invented new and useful Improvements in Flour and Grain-Coolers; and do hereby declare that the following is a full, clear, and exact description thereof, reference being had to the accompanying drawings, which make part of this specification, and in which—

Figure 1 represents a vertical section of my improved flour-cooler, at the line $y\ y$ of fig. 2; and Figure 2, a horizontal section of the same, at the line $x\ x$ of fig. 1.

The object of my invention is to provide a suitable device for quickly and thoroughly cooling flour as it comes from the burrs, and thereby expediting the bolting and packing thereof; to which end, My improvements consist in a number of circular cooling-pans, placed vertically, one above the other, in which agitators, secured upon a common shaft which passes through the centres of the pans, rotate. The blades of each agitator are so inclined as to stir and sweep the flour towards the periphery of the pan, near which a spout is placed, through which it escapes, and falls into a trough, in which a screw-conveyer, geared to the agitator-shaft, revolves, by which it is carried to a point near the centre of the pan below, and falls into it, being stirred and expelled near its periphery, as before, and so on through all the pans, thereby causing the flour to be thoroughly stirred and exposed to the cool air.

In the accompanying drawings, which show a convenient arrangement of parts for carrying out the objects of my invention—

A A represent circular cooling-pans, which are placed vertically, one above the other, and attached to the uprights or frame-pieces $a\ a$. The spaces between the pans can be covered with wire-cloth gauze, perforated sheet-metal, or other material which will give access to the air, or may be left open, as preferred. In the former case, a door, E, is provided.

A vertical shaft, B, passes through the centres of the pans, and bears upon a step beneath the lowest, being rotated by means of a pulley, B', secured upon the top.

This shaft carries agitators, D D, one in each pan, provided with blades, $d$, inclined in such manner as to stir and sweep the flour towards the periphery of the pan.

Troughs, C', are placed beneath all the pans, except the last or lowest, containing screw-conveyers, C, secured upon horizontal shafts carrying bevel-wheels, $c$, which gear with similar wheels, $b$, upon the shaft B, from which rotation is imparted to the conveyers C.

The flour escapes from each pan through a spout, $a^1$, placed near its periphery, and falls into the conveyer-trough C', below it. The conveyer C carries the flour to the inner end of the trough, from which it escapes through an opening, $c'$, and drops into the pan below, at a point near its centre. It is stirred and expelled from the periphery of this pan in a similar manner, and the operation repeated in every pan, the number of which may be as great as found necessary and convenient.

The flour is fed to the uppermost pan through a spout, $a^2$, falling into it near its centre, and escapes from the lowest through a spout, $a^3$, near its periphery.

It will be seen that the flour is received near the centre of each pan, stirred therein, and expelled near the periphery, thereby causing it to be thoroughly agitated, and exposed to the cooling-action of the air, and accomplishing the purpose of the invention in an economical and satisfactory manner.

What I claim, and desire to secure by Letters Patent, is—

The arrangement, herein described, of the shaft B and agitators D D, with the cooling-pans A A, provided with spouts $a'\ a'$ near their peripheries, and screw-conveyers C, as and for the purpose set forth.

The above specification signed by me, this 11th day of September, 1868.

JOSEPH S. REYNOLDS.

Witnesses:
  H. S. TRUMBULL,
  R. BURRITT.